July 21, 1964   F. N. PLATT   3,141,440
IMPACT RECORDING INSTRUMENT
Filed April 2, 1962   2 Sheets-Sheet 2
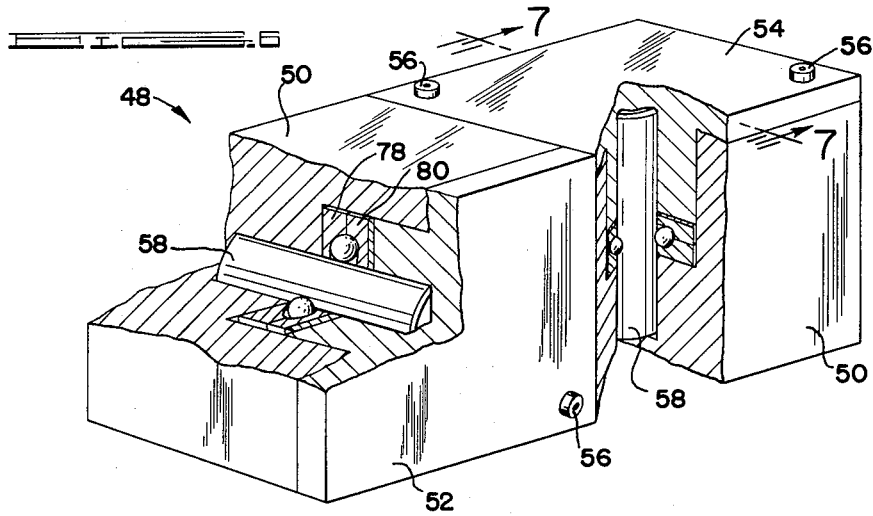
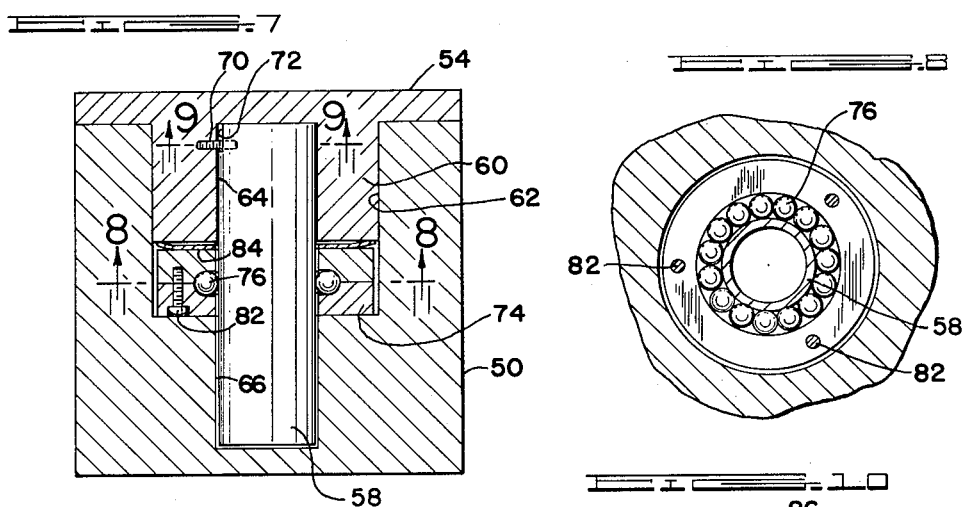
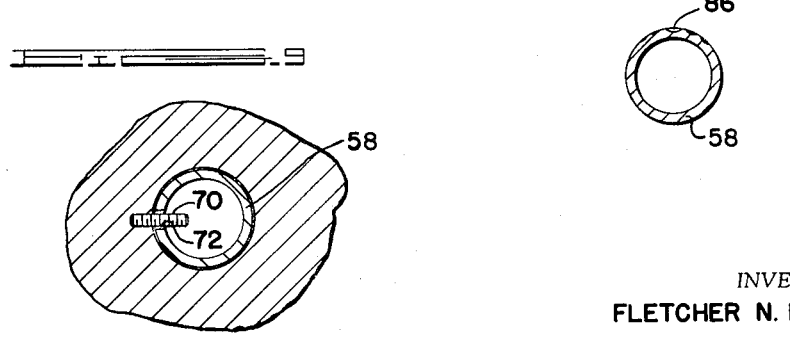
INVENTOR.
FLETCHER N. PLATT
BY
OLSEN AND STEPHENSON
ATTORNEYS United States Patent Office 3,141,440
Patented July 21, 1964

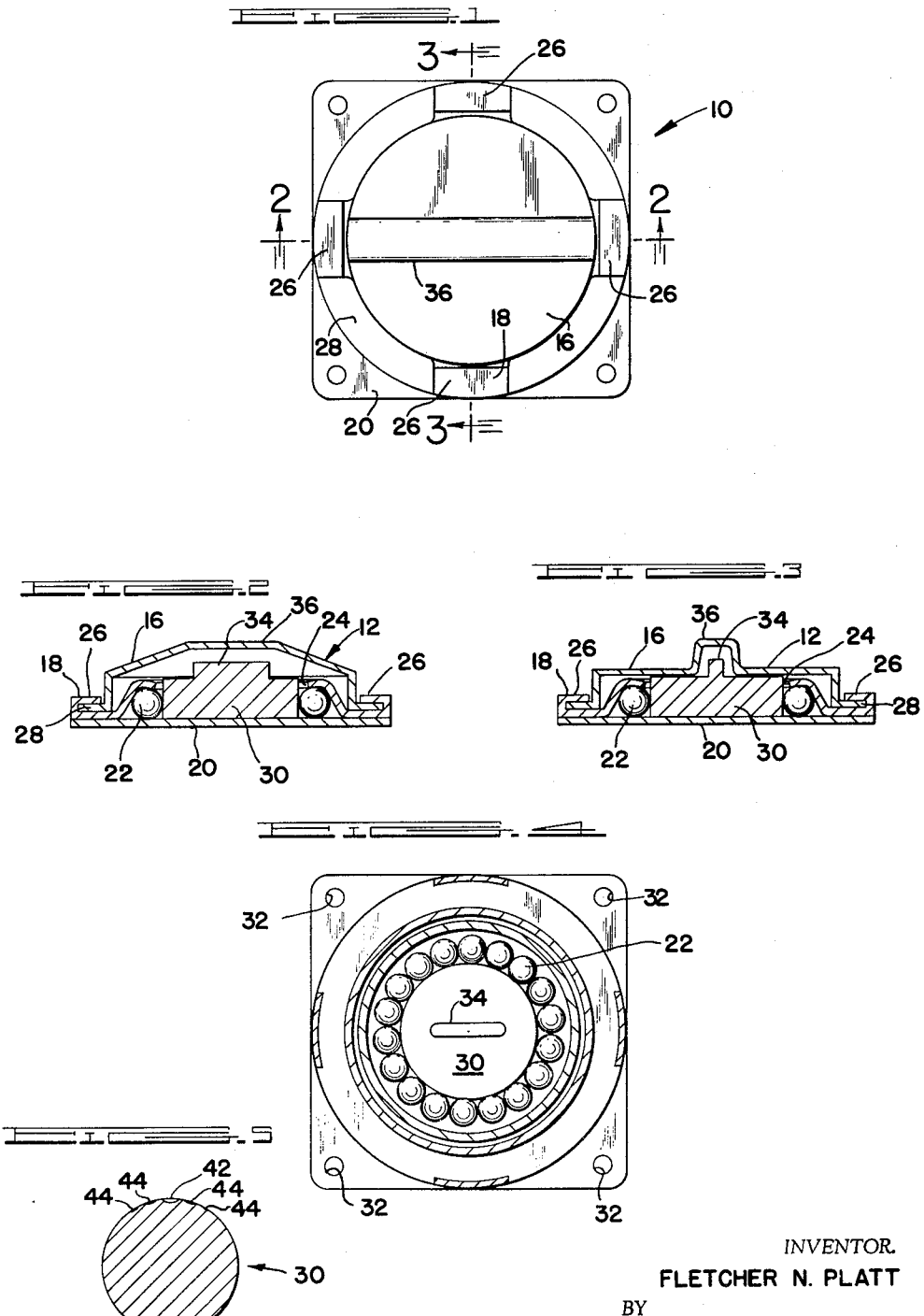

3,141,440
IMPACT RECORDING INSTRUMENT
Fletcher N. Platt, 510 Huntington Drive,
Ann Arbor, Mich.
Filed Apr. 2, 1962, Ser. No. 184,012
9 Claims. (Cl. 116—114)

The present invention relates to impact recording instruments, and particularly to such instruments which can make permanent records of the magnitude and direction of impacts in either two or three dimensions.

It is an object of the present invention to provide an impact recording instrument which is characterized by its simple construction and low manufacturing cost.

It is another object of the present invention to provide an impact recording instrument which is constructed and arranged so that it can be used with devices such as motor vehicles, aircraft and the like which may be subjected to impacts, and wherein the instrument is constructed so that it will not be destroyed by a resulting crash, fire, submersion in water, or the like, of the devices with which it is used, so that a permanent record of the magnitude and direction of impact of such device can be obtained.

It is another object of the present invention to provide an impact recording instrument of the foregoing character which can be easily read so as to determine readily the magnitude and direction of the impact of the device with which the instrument is used.

It is another object of the present invention to provide an impact recording instrument of the foregoing character which is constructed and arranged so that close estimates of the magnitude and direction of the aforesaid impact can be made by visual inspection of the recording element of the instrument.

It is another object of the present invention to provide an impact recording instrument which can be arranged to provide permanent records of magnitudes of impacts in either two or three dimensions.

It is still another object of the present invention to provide an impact recording instrument which is characterized by the relatively small and flat dimensions of the housing of such instrument whereby the instrument can be conveniently located in vehicles, aircraft, athletic equipment worn by participants in various sports and the like, and similar uses.

Other objects of this invention will appear in the following description and appended claims, reference being had to the accompanying drawings forming a part of this specification wherein like reference characters designate corresponding parts in the several views.

In the drawings:

FIGURE 1 is a top plan view of an instrument illustrating one embodiment of the present invention;

FIGURE 2 is a sectional view taken on the line 2—2 of FIGURE 1;

FIGURE 3 is a sectional view taken on the line 3—3 of FIGURE 1;

FIGURE 4 is a fragmentary sectional view similar to FIGURE 1, but with a portion of the top of the housing removed to illustrate the interior of the instrument;

FIGURE 5 is a section taken through the recording element of the instrument illustrated in FIGURES 1-4, after the recording element has been used for recording an impact;

FIGURE 6 is a perspective view with portions broken away illustrating another instrument embodying the present invention;

FIGURE 7 is a sectional view taken on the line 7—7 of FIGURE 6;

FIGURE 8 is a sectional view taken on the line 8—8 of FIGURE 7;

FIGURE 9 is a sectional view taken on the line 9—9 of FIGURE 7; and

FIGURE 10 is a sectional view of the recording element of the embodiment shown in FIGURES 6-9, after such element has been subjected to an impact.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the instrument illustrated in FIGURES 1-4 will be described in greater detail. The impact recording instrument 10 includes a housing 12 suitably formed from a plurality of sheet metal stampings 16, 18 and 20. The element 20 forms the base of the housing 12, and the element 18 may be suitably secured thereto by welding, or the like, the functions with base element 20 to retain a plurality of balls 22 in the circular arrangement, best seen in FIGURE 4. It will be observed from FIGURES 2 and 3 that the balls 22 are secured in place by the overhanging lip 24 of the element 18. The top or cover element 16 is retained in place by means of the ears 26 which are an integral part of the element 18, and which ears 26 are folded over the peripheral edge 28 of the cover element 16.

Centrally located within the annular member or structure comprising the balls 22 and their associated retaining elements 18 and 20, is a recording member or structure 30 which has been placed in its illustrated position prior to locking the cover element 16 in place. The recording member member or structure 30 is not attached to the housing 12, and thus, it is confined against lateral movement only by the presence of the balls 22 which provide, in effect, a series of radially projecting protuberances or surfaces in contact with the outer circular surface or wall of the recording member 30.

The housing 12 is intended to be mounted on any object or device with respect to which an impact is to be measured and recorded. For the purpose of mounting the housing on a panel or the like of such an object, the base element 20 may have a plurality of holes 32 for securing the impact recording instrument to such a panel. Under these circumstances, it normally will be desirable to determine not only the magnitude of the impact relative to such a device, but also the direction of impact. For this purpose it is necessary that the location of the impact recording member or structure with respect to such device, at the time of an impact can be established after such impact. In the illustrated embodiment of the invention, the upwardly projecting rib 34 serves this purpose. It will be observed that the rib 34 projects into a groove or slot 36 in the top element 16 of the housing 12. By virtue of this construction, the relationship of the recording member or structure 30 to the device on which the instrument 10 is mounted, will remain fixed until such time as an impact occurs. The recording member or structure 30 will not be able to leave its properly oriented position because of vibrations or the like, in as much as the slot 36 will confine movements of the rib element 34.

As indicated above, the embodiment illustrated in FIGURES 1-4 can be used to record permanently in a single plane the direction and magnitude of an impact. The instrument 10 may be used for this purpose with respect to automobiles, aircraft, boats, or any other movable vehicle. It may also be used to record impacts to which athletic equipment or participants may be subjected, such as in connection with football, hockey or other contact sports. Similarly, it may be used, for example, to record the impact that the head of a football or hockey player wearing a helmet may receive. For the latter use, the instrument can be taped to the head of the player and by virtue of its small and flat shape, it can be worn directly under the helmet of the player.

Normally, the impact recording instrument 10 is mounted with the base element 20 suitably secured to a surface of the device or person in conjunction with which the impacts are to be recorded. The groove or slot 36 into which the rib 34 penetrates will be aligned in a predetermined direction so that if the instrument 10 is dislodged from the surface on which it is mounted, as a result of the impact, the direction of the impact relative to the surface can be determined readily. Following the impact, the cover element 16 is removed and the recording member or structure 30 is taken from the housing 12. It will then be found from an inspection of the recording member or structure that there will be on its circular outer surface series of indentations which are a direct function of the direction and magnitude of the impact. As can be understood by those skilled in the art, when a heavy and relatively soft mass such as the recording member or structure 30 is subjected to an impact, its momentum will resist a change in its state of motion such as would be caused by the impact; and the circular member or structure comprising the relatively hard balls 22, will have its state of motion changed by the impact to the same extent as the device or person on which the instrument is mounted. Thus, there will be relative movement between the circular member or structure and the recording member or structure 30 resulting in the balls of the circular member or structure penetrating the circular surface of the recording member or structure 30 in line with the direction of the impact and to a depth which will be a function of the magnitude of the impact.

Referring to FIGURE 5, an illustration can be seen of the type of deformation that takes place when such an impact occurs. From this illustration it will be recognized that the impace that was recorded was directed through the depression 42 directly to the center of the illustrated recording member or structure 30. It can be seen that the largest depression 42 is centrally located with respect to the other depressions 44 which become progressively smaller. By using a microscope with a suitable scale and a suitable calibration chart, the magnitude of the impact can be readily determined. This is accomplished by inspecting the individual indentations and recording the diameter of each indentation, and with the aid of a calibration chart. The figures for each indentation are totaled and this sum represents the vector force of the impact in the plane in which the measurements were taken.

In the illustrated embodiment, the balls 22 forming the radially inwardly projecting surfaces of the circular member or structure are preferably made of stainless steel, and the recording member or structure 30 may be made of suitable softer material, such as lead. The calibration chart that will be used must necessarily be arrived at for materials of predetermined weight and hardness.

From the foregoing, it will be understood that the described embodiment of the invention is a relatively small, simple and compact device which can be made at relatively low cost and which does not occupy much space.

It will also be understood that it serves merely to record the resultant vector force of an impact in a single plane. If it is desired to obtain the resultant vector force in three dimensions, it will be necessary that a second recording instrument, similar to the one previously described, be mounted on the same device on which recording instrument 10 was mounted, but with its central axis at ninety degrees to the axis of recording instrument 10. Then by a proper vector analysis of the results derived from the recording members or structures of each of the two recording instruments, the vector sums of the two instruments will give the total impact and will give the resultant direction of such impact.

A modified form of the invention is illustrated in FIGURES 6-9, and the recording instrument 48 illustrated in these fiigures will now be described. In this embodiment of the invention, a housing 50 is provided which has two removable cover plates 52 and 54. These cover plates can be retained in place by suitable mounting screws 56. As can best be seen in FIGURE 6, the housing 50 has two portions, each portion being adapted to receive a recording member or structure 58 which is ninety degrees out of alignment with the other member or structure. The construction and arrangement of one of the vertical recording members or structures 58 and its associated parts is illustrated in FIGURES 7, 8 and 9, and this portion of the recording instrument 48 will now be described. The cover element 54 has an integral tubular projection 60 which is designed to fit closely into a cavity 62 in the housing 50. The internal bore 64 of the projection 60 is the same as and is aligned with the bore 66 in housing 50. Positioned within the bores 64 and 66 is a recording tube or structure 58 which is held against lateral movement with respect to housing 50. Also, the recording tube or structure 58 is held against rotational movement by means of a suitable screw 70 that is threadedly connected to projection 60 and extends into the slot 72 of recording member or structure 58.

Positioned within the cavity 62 between the projection 60 and the inner end wall of the cavity 62 is a relatively heavy circular member 74 which has a plurality of balls 76 retained therein so as to form a structure having a series of circularly arranged, equally spaced radial projections or radially protruding surfaces of uniform dimensions.

The circular member 74 is made of two sections 78 and 80 which form between them an annular groove in which the balls 76 are located and which have at least one overhanging lip to prevent the balls from falling from the annular groove. The sections 78 and 80 are secured together by a plurality of screws 82. In order to retain the circular member 74 in place against vibrating and the like, a conventional spring washer 84 may be positioned between the circular member 74 and either the projection 60 or the inner end wall of the cavity 62. As best seen in FIGURE 7, the relatively heavy circular member 74 is restricted in lateral movement only by contact of the balls 76 with the recording member or structure 58.

Thus, in the embodiment illustrated in FIGURES 6-9 a modified arrangement from that shown in FIGURES 1-4 is provided in that the central and recording member or structure 58 is held against movement in the housing 50 for deforming the circular surface of member or structure upon impact, whereas, in the first described modificaion, the circular member or structure formed to include the balls 22 was held stationary with respect to housing 12 and the relatively heavy recording member or structure 30 could move relative to housing 12. In the second described embodiment, the balls 76 are preferably made of stainless steel and the recording member or structure 58 is preferably made of a softer material such as aluminum. When an impact occurs involving the device on which the recording instrument 48 is mounted, the structure including the circular member 74 and the balls 76 will cause impressions to be formed in the circular surface of the recording member or structure 58 such as can be seen in FIGURE 10. As here shown, the largest depression 86 represents the direction of impact through the axis of the recording member or structure 58. Again, the direction and magnitude in one plane of the impact can be determined by using a microscope with a suitable scale, and with the aid of a calibration chart the total impact in one of the planes under consideration can be determined.

The same steps of measuring can also be carried out with respect to the other recording member or structure 58 associated with cover 52 of the recording instrument 48. As seen with respect to FIGURE 6, the two recording members or structures 58 are disposed at ninety degrees to one another and by proper vector analysis of the forces recorded for each of the two planes in which the impact was recorded, a resultant impact force can be established both with respect to its magnitude and direction.

The instrument 48 is particularly designed for recording impacts that may result in connection with aircraft operations. For this reason, it is particularly necessary that the instrument be capable of withstanding a crash in which the aircraft may be involved and also a subsequent fiire or flood. As can be understood, this embodiment of the invention is particularly well suited for these purposes. The housing 50 can be made from a metal having a relatively high melting point so as to withstand the destructive forces and elements that may occur in connection with aircraft crashes or explosions.

The steps that are taken in connection with recording impacts in connection with aircraft or similar moving vehicles, normally proceed with the housing 50 being attached to a rigid structure of the aircraft before the installation of the aluminum recording tubes or structures 58. The mounting location should be one wherein the two cover plates 52 and 54 can be removed and replaced after the housing has been secured. The housing should also be located so that heavy structures will not break loose and strike the instrument during impact. It is also desirable, but not necessary, to orient the instrument 48 so that the direction of maximum force is lengthwise of the instrument so that readings in this plane will be obtained on both recording members or structures 58. The cover plates 52 and 54 are normally also designed so that they are not interchangable and can only be locked in place in one predetermined place. Likewise, the slots 70 in which the screws 72 are fitted are of different dimensions so that the recording members or structures 58 are not interchangable. These features are incorporated in the described embodiment for positive position indentification after removal of these recording members or structures from the instrument.

Normally the recording members or structures 58 are installed in the housing 50 immediately prior to a test that is to be conducted and after all chance of direct impacts due to improper setups are eliminated.

Immediately after the aircraft or similar vehicle has been subjected to impact, the recording members or structures 58 should be carefully removed and wrapped in foil to prevent inadvertent denting or scratching before inspection. Care should be taken before removing the housing 50 from the supporting structure to prevent secondary recording on the tubes. Thereafter, by using a microscope with a millimeter scale and a suitably prepared calibration chart, the impact in each plane with which the recording members 58 are associated, can be determined. Conventional vector solutions will then provide the resultant vector force, disclosing both the direction and magnitude of such force.

Having thus described my invention, I claim:

1. A gauge for recording the intensity and direction of an impact comprising a housing, a circular structure in said housing having a series of uniformly spaced and uniformly dimensioned radially protruding surfaces, and a recording structure in said housing having a circular surface adjacent to and facing said radially protruding surfaces, one of said structures being retained against movement in said housing, said recording structure having less deformation resistance than said radially protruding surfaces so that on lateral movement of said structures relative to one another caused by an impact said radially protruding surfaces will penetrate said circular surface in numbers and in direction as a function of the magnitude and direction of said impact.

2. A gauge for recording the intensity and direction of an impact comprising a housing, a relatively heavy annular structure in said housing having a series of uniformly spaced and uniformly dimensioned radially protruding surfaces, and a recording structure in said housing having a circular surface adjacent to and facing said radially protruding surfaces, said recording structure being held in said housing against lateral movement, said annular structure being restricted in lateral movement only by said recording structure, the circular surface of said recording structure having less deformation resistance than said radially protruding surfaces so that on lateral movement of said annular structure relative to said recording structure caused by an impact said radially protruding surfaces will penetrate said circular surface in numbers and in direction in accordance with the magnitude and direction of said impact.

3. A gauge as claimed in claim 2 wherein means are provided on said recording structure for determining after an impact its original orientation relative to said housing.

4. A gauge for recording the intensity and direction of an impact comprising a housing, an annular structure in said housing having a series of uniformly spaced and uniformly dimensioned radially protruding surfaces, and a relatively heavy recording structure in said housing having a circular surface adjacent to and facing said radially protruding surfaces, said annular structure being held in said housing against lateral movement, said recording structure being restricted in lateral movement only by said annular structure, the circular surface of said recording structure having less deformation resistance than said radially protruding surfaces so that on lateral movement of said recording structure caused by an impact said radially protruding surfaces will penetrate said circular surface in numbers and in direction in accordance with the magnitude and direction of said impact.

5. A gauge as claimed in claim 4 wherein means are provided on said recording structure for determining after an impact its original orientation relative to said housing.

6. A gauge for recording the intensity and direction of an impact comprising a housing, a first recording assembly in said housing including a circular structure having a series of radially protruding surfaces in one plane and a recording structure having a circular surface adjacent to and facing said radially protruding surfaces, one of said structures being retained against movement in said housing, said recording structure having less deformation resistance than said radially protruding surfaces so that on lateral movement of said structures relative to one another said radially protruding surfaces will penetrate said circular surface in numbers and in direction in said one plane as a function of the magnitude and direction of said impact, a second recording assembly in said housing constructed and arranged generally the same as the first recording assembly but oriented so that its series of radially protruding surfaces are in a second plane located at an angle to said one plane.

7. A gauge as claimed in claim 6 wherein the recording structures of the first and second recording assemblies have identification means to indicate the plane with which each recording structure was associated.

8. A gauge as claimed in claim 6 wherein said second plane is located at a right angle to said one plane.

9. A gauge for recording the intensity and direction of an impact comprising means defining an enclosure with a circular cavity therein and having a series of uniformly spaced and uniformly dimensioned radially inwardly projecting surfaces in the wall of said cavity, and a recording member in said cavity having a circular surface adjacent to and facing said projecting surfaces, said recording member having less deformation resistance than said projecting surfaces so that on lateral movement of said member relative to said projecting surfaces caused by an impact said projecting surfaces will penetrate said circular surface in numbers and in direction as a function of the magnitude and direction of said impact.

References Cited in the file of this patent

UNITED STATES PATENTS

| | | |
|---|---|---|
| 2,472,108 | Hickman | June 7, 1949 |
| 2,575,973 | Perry | Nov. 20, 1951 |
| 2,721,071 | Kempton | Oct. 18, 1955 |
| 2,976,732 | Hautly | Mar. 28, 1961 |
| 3,020,874 | Bruce et al. | Feb. 13, 1962 |
| 3,021,813 | Rips | Feb. 20, 1962 |

FOREIGN PATENTS

| | | |
|---|---|---|
| 1,066,586 | France | Jan. 20, 1954 |